US012599189B2

(12) United States Patent
Bachmann

(10) Patent No.: US 12,599,189 B2
(45) Date of Patent: Apr. 14, 2026

(54) HELMET CAMERA SYSTEM, FASTENING DEVICE, HELMET SYSTEM, AND CAMERA SYSTEM

(71) Applicant: Dräger Safety AG & Co. KGaA, Lübeck (DE)

(72) Inventor: Bernhard Bachmann, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 0 days.

(21) Appl. No.: 18/711,204

(22) PCT Filed: Nov. 15, 2022

(86) PCT No.: PCT/DE2022/100849
§ 371 (c)(1),
(2) Date: May 17, 2024

(87) PCT Pub. No.: WO2023/088516
PCT Pub. Date: May 25, 2023

(65) Prior Publication Data
US 2025/0017306 A1 Jan. 16, 2025

(30) Foreign Application Priority Data

Nov. 22, 2021 (DE) ..................... 10 2021 130 474.1

(51) Int. Cl.
*A42B 3/04* (2006.01)
*F16B 2/04* (2006.01)

(52) U.S. Cl.
CPC ................ *A42B 3/042* (2013.01); *F16B 2/04* (2013.01); *F16B 2200/83* (2023.08)

(58) Field of Classification Search
CPC ........ A42B 3/042; F16B 2/04; F16B 2200/83; F16M 2200/024; F16M 11/08; F16M 11/041
(Continued)

(56) References Cited

U.S. PATENT DOCUMENTS 8,931,375 B2 * 1/2015 Huang ..................... B25B 15/04
81/63.1
9,651,069 B2 * 5/2017 Aspinall ................... F16B 2/04
(Continued)

FOREIGN PATENT DOCUMENTS

CN 209609975 U 11/2019
CN 111264965 A 6/2020
(Continued)

*Primary Examiner* — Christopher Garft
(74) *Attorney, Agent, or Firm* — McGlew and Tuttle, P.C.

(57) ABSTRACT
A helmet camera system (10) includes a helmet (11), a camera (12), a helmet holding device (13) fastened to the helmet and a camera holding device (14) fastened to the camera. The helmet holding device and the camera holding device are configured such that they can be connected to one another in non-positive and/or positive-locking manner for holding the camera at the helmet. The helmet holding device has a toothed ring (15) having internal teeth and the camera holding device has at least one toothed ring segment (16) having external teeth. The toothed ring segment can be positioned in the toothed ring for establishing the non-positive and/or positive-locking connection between the helmet holding device and the camera holding device. A fastening device, a helmet system as well as a camera system for a helmet camera system (10) are provided.

12 Claims, 2 Drawing Sheets

(58) Field of Classification Search
USPC ........................................ 248/220.21, 292.12
See application file for complete search history.

(56)                    References Cited

U.S. PATENT DOCUMENTS

| | | | | | |
|---|---|---|---|---|---|
| 9,914,201 | B2 * | 3/2018 | Chu | ...................... | B25B 13/468 |
| 11,964,366 | B2 * | 4/2024 | Hsieh | .................. | B25B 23/0035 |
| 2007/0240544 | A1 * | 10/2007 | Hu | .......................... | B25B 15/04 |
| | | | | | 81/63.1 |
| 2007/0243763 | A1 * | 10/2007 | Hu | .......................... | B25B 15/04 |
| | | | | | 439/607.01 |
| 2008/0131106 | A1 * | 6/2008 | Bruce | ................... | G03B 17/08 |
| | | | | | 396/25 |
| 2009/0199683 | A1 * | 8/2009 | Hu | ........................ | B25B 13/465 |
| | | | | | 81/436 |
| 2010/0237206 | A1 * | 9/2010 | Barker | ................... | F16M 13/08 |
| | | | | | 248/206.5 |

| | | | | | |
|---|---|---|---|---|---|
| 2015/0002930 | A1 | 1/2015 | Teetzel et al. | | |
| 2015/0282345 | A1 * | 10/2015 | Aspinall | ................. | H04M 1/04 |
| | | | | | 248/316.4 |
| 2015/0286117 | A1 | 10/2015 | Sung et al. | | |
| 2016/0212869 | A1 | 7/2016 | Gutschenritter et al. | | |
| 2017/0067597 | A1 | 3/2017 | Prugue | | |
| 2018/0059516 | A1 | 3/2018 | Taylor et al. | | |
| 2020/0218139 | A1 * | 7/2020 | Tiefenbrunn | ............. | F16B 2/12 |
| 2021/0180642 | A1 | 6/2021 | Botkus et al. | | |
| 2022/0214601 | A1 * | 7/2022 | Tiefenbrunn | ....... | F16C 11/0623 |

FOREIGN PATENT DOCUMENTS

| | | |
|---|---|---|
| CN | 215685142 U | 2/2022 |
| CN | 217509968 U | 9/2022 |
| DE | 102017125846 A1 | 5/2019 |
| WO | 2016174255 A1 | 11/2016 |
| WO | 2019213679 A1 | 11/2019 |

* cited by examiner

HELMET CAMERA SYSTEM, FASTENING DEVICE, HELMET SYSTEM, AND CAMERA SYSTEM

CROSS REFERENCE TO RELATED APPLICATIONS

This application is a United States National Phase Application of International Application PCT/DE2022/100849, filed Nov. 15, 2022, and claims the benefit of priority under 35 U.S.C. § 119 of German Application 10 2021 130 474.1, filed Nov. 22, 2021, the entire contents of which are incorporated herein by reference.

TECHNICAL FIELD

The present invention pertains to a helmet camera system, having a helmet, a camera, a helmet holding device fastened to the helmet and a camera holding device fastened to the camera, wherein the helmet holding device and the camera holding device are configured such that they can be connected to one another in a non-positive and/or positive-locking manner for holding the camera at the helmet.

BACKGROUND

It is important during an operation of a fire brigade for the firefighter to be able to concentrate on his essential tasks and for not having to hold in the process any additional devices such as thermal imaging cameras in his hands. It should therefore be possible to adapt these devices to the head protection system of the user. There are currently different approaches for fastening cameras and other products to the helmet or to a corresponding head protection device. This pertains for the most part to the fastening of lights and lighting systems. Lights are usually fastened in a middle position to the helmet in order to avoid the formation of shadows and to make possible a central illumination as much as possible. Lights can, moreover, usually be removed and/or installed by means of tools in systems of this kind. Further, thermal imaging cameras that are mounted on the helmet in a fixed position and immovably are known.

Helmet camera systems, in which manual fastening of the camera to the helm and manual detachment of the camera from the helmet are possible, are known in the area of hobby and leisure activities. Aside from the fact that these systems are not suitable, as a rule, for professional use, for example, for firefighting, these systems usually also offer, as a rule, only a relatively complex fastening system that can be mounted only at rest and with concentration.

Furthermore, universal adapters, especially for lights, which fit different, commercially available helmets, are known for professional use. These are available as manually detachable variants, in which the light is, moreover, adjustable in terms of the fastening angle. Even though the light can be removed and rotated manually in these solutions, there is a risk that the position of the light will change easily on impact.

SUMMARY

An object of the present invention is to take the above-described problem into account at least partly. In particular, the object of the present invention is to make available a system for a simple, flexible and yet stable mounting of a helmet camera.

The above-described object is accomplished by the patent claims. The above-described object is especially accomplished by the helmet camera system according to claim 1, the fastening device according to claim 8, the helmet system according to claim 9 as well as the camera system according to claim 10. Further advantages of the present invention appear from the subclaims, from the description and from the figures. Features that are described in connection with the helmet camera system are, of course, also valid in connection with the fastening device according to the present invention, with the helmet system according to the present invention, with the camera system according to the present invention, and also vice versa, so that reference is and/or can always mutually be made to the individual aspects of the present invention concerning the disclosure.

According to a first aspect of the present invention, a helmet camera system is proposed, which has a helmet, a camera, a helmet holding device fastened to the helmet, and a camera holding device fastened to the camera, wherein the helmet holding device and the camera holding device for holding the camera at the helmet are configured such that they can be connected to one another in a non-positive and/or positive-locking manner. The helmet holding device has a toothed ring having internal teeth and the camera holding device has at least one toothed ring segment having external teeth, wherein the toothed ring segment can be positioned between the helmet holding device and the camera holding device for establishing the non-positive and/or positive-locking connection between the helmet holding device and the camera holding device.

Mounting of the camera at the helmet, which mounting is prevented from rotation in a reliable manner, is possible in a simple manner by the toothed ring according to the present invention and by the corresponding toothed ring segment. The camera only needs to be positioned for this in the desired position in the toothed ring. Due to the interaction of the camera holding device and the helmet holding device, the camera is subsequently held at the helmet. Different holding and/or fastening mechanisms are possible for holding the camera securely at the helmet. For adjusting the camera into another position, the camera holding device can be detached from the helmet holding device, so that the toothed ring segment is also detached from the toothed ring. The camera, including the camera holding device and the toothed ring segment, can then be rotated relative to the toothed ring and it can then be fastened in a desired relative position between the toothed ring segment and the toothed ring and it can then be fastened again at the helmet holding device or can be inserted there.

A connection mechanism, with which the camera can be mounted on the helmet not only rapidly and in a simple manner, but it can also be detached intuitively, can be formed by means of the toothed ring and the toothed ring segment or two mutually fittingly configured toothed rings. An accidental change of the camera angle, either spontaneous or due to impact of the camera at an obstacle, can be prevented. The camera can be positioned and/or fastened in defined angular positions rapidly and in a simple manner during the use. Fastening accessories and/or tools are not needed.

The camera is defined especially as a thermal imaging camera, preferably for use during firefighting operations or for use under extreme ambient conditions, such as fire.

The toothed ring having internal teeth may be defined as a toothed ring and/or as a pinion, in which the teeth protrude radially inwards. The toothed ring segment having external teeth may be defined as a toothed ring segment and/or as a pinion segment, in which the teeth protrude radially outwards. The at least one toothed ring segment extends in a circumferential direction preferably over a range between 20° and 120°. The helmet may be defined as a head protection system in the broadest sense of the word, i.e., the helmet may be defined not only as a simple helmet shell, but also as a head protection system with, for example, a visor, with a mouth guard, with a breathing gas access and/or other technical functional units.

The helmet holding device is preferably connected integrally to the helmet (forms a one piece construction therewith), so that a manual detachment from the helmet is not possible or intended. It is likewise preferred if the camera holding device is connected integrally to the camera (forms a one piece construction therewith), so that a manual detachment from the camera is not possible or intended. The camera holding device may be configured especially as a part of a camera housing.

The holding system according to the present invention, including the toothed ring and the at least one toothed ring segment, can be adapted basically for use for all available helmets. An adaption to already existing interfaces on helmets is possible as well.

According to another embodiment of the present invention, a helmet camera system comprises an adjusting device for manually adjusting the at least one toothed ring segment in a radial direction of the toothed ring segment between a held state for establishing the non-positive and/or positive-locking connection and a released state for severing the non-positive and/or positive-locking connection. Simple manual operation of the adjusting device and consequently a simple adjustment of the camera at the helmet are thus possible. The adjusting device may have at least one button or corresponding actuating device, by actuating which the toothed ring segment can be moved in the radial direction of the toothed ring segment between the held state and the released state. The rotation by pressing the button can be initiated deliberately. After releasing the at least one button, the camera or the at least one toothed ring segment is fixed in the desired end position. The path of adjustment of the at least one button may be limited by a limiting device, so that the user must or can press only to the extent that the desired rotary motion is released. The possible setting of the angle is limited by the teeth of the at least one toothed ring segment as well as of the toothed ring. The rotation can consequently be limited to an extent necessary and/or useful for the application. The adjusting device may have a lever mechanism, and/or a prestressing mechanism, by which the toothed ring segment can be moved in the radial direction of the toothed ring segment between the held state and the released state by actuating the at least one button. The adjusting device is preferably configured as a part of the camera holding device. The adjustment of the at least one toothed ring segment in the radial direction can be defined especially as a movement of the toothed ring segment in the radial direction towards or away from the toothed ring.

Furthermore, it is possible that the adjusting device in a helmet camera system according to the present invention is a spring device for the resilient adjustment of the at least one toothed ring segment between the held state and the released state. The camera can be adjusted by the spring element in a simple manner with one hand. It is thus possible that the at least one toothed ring segment is brought by the adjusting device, for example, with two fingers against the spring force or against a corresponding prestressing force of the spring device, which force acts preferably in the actuation direction and/or radial direction, into the desired released position in order to adjust the position of the camera or the orientation of the camera. As soon as the desired position and/or orientation is reached, the fingers can be removed from the adjusting device and/or from a button of the adjusting device, so that the at least one toothed ring segment is moved back into its starting position by the spring device. Such an operation can be carried out in a relatively reliably manner even when the user is wearing gloves and/or has no visual contact. A user can, in addition, obtain a sufficiently clear haptic and/or tactile feedback on the state of the toothed ring segment during the operation.

A helmet camera system according to the present invention may further have two toothed ring segments positioned opposite one another, wherein the adjusting device for adjusting the two toothed ring segments is configured in the same adjustment direction. An especially simple adjustment actuation with only one hand is thus possible. Due to the toothed ring segments being positioned mutually opposite each other, these can be adjusted using one hand by means of a symmetrical introduction of force to the camera holding device. The adjusting device may have in this case a spring device, especially with two spring elements, for the resilient adjustment of the two toothed ring segments in relation to one another between the held state and the released state. The adjustment direction may be defined as a radial direction, i.e., the direction in which the teeth of the toothed ring and of the toothed ring segments extend. The adjustment direction may be the same as an actuating direction. The adjustment of the two toothed ring segments in the same adjustment direction can be defined such that the two toothed ring segments can always be adjusted radially inwards as well as radially outwards. During the adjustment of the toothed ring segments for changing from the released state into the held state or from the held state back into the released state, the toothed ring segments are adjusted or moved in the adjustment direction or radial direction towards one another or away from one another, i.e., simultaneously radially inwards or radially outwards. The adjusting device may have two individually actuatable buttons, which are held in an end position by a spring device each and/or are mounted in a pressure-applied manner for adjusting the two toothed ring segments.

In addition, it is possible that in a helmet camera system according to the present invention, the spring device is configured to press the at least one toothed ring segment in the held state to the toothed ring. A stable connection can thus be established in a simple manner between the helmet holding device and the camera holding device. In addition, a user can thus obtain a tactile feedback of when and/or whether the at least one toothed ring segment is in the held state in the desired end position at the toothed ring. The fact that the spring device is configured to press the at least one toothed ring segment in the held state onto the toothed ring can be defined such that the spring device applies pressure to the toothed ring in the held state by the at least one toothed ring segment.

Moreover, a helmet camera system according to the present invention may have a locking device for establishing a locking connection between the helmet holding device and the camera holding device in the held state. The connection between the helmet holding device and the camera holding device can be stabilized by the locking device in a simple manner. The locking device may be formed in the area of teeth and/or as a part of the teeth between the toothed ring and the at least one toothed ring segment. It is, in particular, possible that the at least one toothed ring segment has trapezoidal teeth and the toothed ring has an undercut area and/or a setback area for establishing the locking connection. It is thus possible that not only a rotation prevention, but at the same time also a locking connection for preventing the at least one toothed ring segment from falling out of the toothed ring are established when the at least one toothed ring segment meshes with the toothed ring.

It is possible, as an alternative or in addition, in another embodiment variant of the present invention for a helmet camera system to have a magnet device for establishing a magnetic connecting force between the helmet holding device and the camera holding device in a held state, in which the at least one toothed ring segment for establishing the non-positive and/or positive-locking connection is positioned at the toothed ring. An especially simple and compact device is thus created for the desired holding of the helmet holding device and of the camera holding device and/or for increasing the holding force between the helmet holding device and the camera holding device. While the teeth between the toothed ring and the at least one toothed ring segment is used to prevent a rotation between the helmet holding device and the camera holding device or between the camera and the helmet, especially a falling out of the at least one toothed ring segment from the toothed ring can be prevented by the magnet device. The magnet device may have a first magnet element at the helmet holding device and a second magnet element at the camera holding device. The magnet element may be defined as a magnet or as a ferromagnetic material. The holding force can be set individually by selecting the strength and the quality of the magnets and/or magnet elements.

According to another aspect of the present invention, a fastening device for a helmet camera system with a helmet and with a camera is proposed. The fastening device has a helmet holding device, which can be fastened to the helmet and a camera holding device, which can be fastened to the camera, wherein the helmet holding device and the camera holding device for holding the camera at the helmet are configured such that they can be connected to one another in a non-positive and/or positive-locking manner. The helmet holding device has a toothed ring having internal teeth and the camera holding device has at least one toothed ring having external teeth, wherein the toothed ring segment can be positioned in the toothed ring for establishing the non-positive and/or positive-locking connection between the helmet holding device and the camera holding device. The fastening device according to the present invention thus offers the same advantages as they were described in detail in reference to the helmet camera system according to the present invention.

In addition, a helmet system for a helmet camera system as described above, which has a helmet with a head protection shell and with a helmet holding device formed at the head protection shell, is proposed according to the present invention, wherein the helmet holding device is configured as an integral component of the head protection shell (forms a one piece construction therewith). The helmet system according to the present invention thus also offers the above-described advantages. Due to the integral configuration of the helmet holding device at the head protection shell, the helmet holding device has an especially stable configuration at the helmet. As a result, a correspondingly stable fastening of the camera or camera holding device at the helmet system can be made possible. At least one part of the helmet holding device can be configured as a monolithic part of the head protection shell. The main component of the helmet shall be defined as the head protection shell, which main component or head protection shell is to protect the head of the user.

Another aspect of the present invention pertains to a camera system for a helmet camera system as described above, which has a camera with a camera housing and with a camera holding device formed at the camera housing, wherein the camera holding device is configured as an integral component of the camera housing (forms a one piece construction therewith). The camera system according to the present invention thus offers the above-described advantages as well. Due to the integral configuration of the camera holding device on the camera housing, the camera holding device can be connected to the camera in an especially stable manner. As a result, a correspondingly stable fastening of the camera or of the camera holding device to the helmet system can be made possible. At least one part of the camera holding device may be configured as a monolithic part of the camera housing.

Further measures improving the present invention appear from the following description of some exemplary embodiments of the present invention, which are shown in the figures. All the features and/or advantages appearing from the claims, from the description or from the drawings, including structural details and arrangements in space, may be essential for the present invention both in themselves and in the different combinations. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figures 1, 2:
FIG. 1 is a sectional view of a helmet camera system according to the present invention in a lateral view.
FIG. 2 is a sectional view of a helmet camera system according to the present invention in a top view.

Referring to the drawings, elements having the same function and mode of operation are designated by the same respective reference numbers in the figures.

FIG. 1 shows a helmet camera system 10 according to a preferred embodiment. The helmet camera system 10 shown has a helmet 11, a camera 12, a helmet holding device 13 fastened to the helmet 11 and a camera holding device 14 fastened to the camera 12. The helmet holding device 13 and the camera holding device 14 are configured such that they can be connected to one another in a non-positive and positive-locking manner for holding the camera 12 at the helmet 11. The helmet holding device 13 has a toothed ring 15 having internal teeth and the camera holding device 14 has two toothed ring segments 16 having external teeth, wherein the toothed ring segment 16 can be positioned and in FIG. 1 is positioned in the toothed ring 15 for establishing the non-positive and positive-locking connection between the helmet holding device 14 and the camera holding device 14. The camera holding device 14 is configured as an integral component of the camera housing 23.

The helmet camera system 10 further comprises an adjusting device 17 for manually adjusting the two toothed ring segments 16 in a radial direction 18 of the toothed ring segments 16 between a held state for establishing the non-positive and positive-locking connection and a released state for severing the non-positive and positive-locking connection. The adjusting device 17 has a spring device 19 for the resilient adjustment of the at least one toothed ring segment 16 between the held state and the released state. The adjusting device 17 further has two fastening devices 24 in the form of two buttons, by which the adjusting device 17 can be actuated for adjusting the toothed ring segments 16 between the held state and the released state. The spring device 19 has two spring elements, which are positioned at the actuating devices and are configured to press the two toothed ring segments 16 onto the toothed ring 15 in the held state. The helmet camera system 10 shown further has a locking device 20 for establishing a locking connection between the helmet holding device 13 and the camera holding device 14 in the held state. Moreover, the helmet camera system 10 has a magnet device 21 for establishing a magnetic connecting force between the helmet holding device 13 and the camera holding device 14 in a held state in which the toothed ring segments 16 are positioned at the toothed ring 15 for establishing the non-positive and positive-locking connection.

FIG. 2 shows a top view of the helmet camera system 10 shown in FIG. 1. As can be seen in FIG. 2, the two toothed ring segments 16 are positioned opposite each other, and the adjusting device 17 is configured for adjusting the two toothed ring segments 16 in the same adjustment direction, more precisely, in the radial direction 18. The integration of the actuating device 24 in the camera housing 23 is achieved by means of grooves accessible from the side. A holding ring segment 27 prevents the actuating device 24 from falling out and holds the actuating devices 24 in the desired position.

Figure 3:
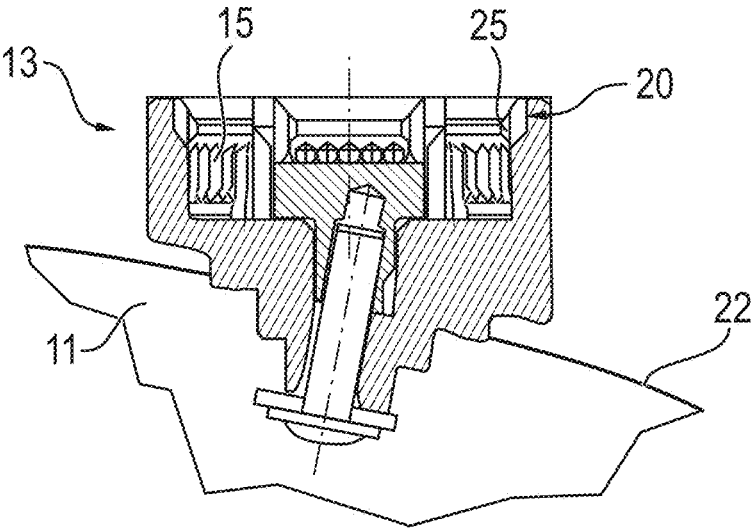
FIG. 3 is a sectional view of a helmet system according to the present invention.

FIG. 3 shows a helmet system for a helmet camera system 10 shown in FIG. 1. The helmet system has the helmet 11 with a head protection shell 22 and with a helmet holding device 13 formed at the head protection shell 22, wherein the helmet holding device 13 is configured as an integral component of the head protection shell 22. Further, FIG. 3 shows a locking element 25 at the toothed ring 15, which locking element can be brought into locking contact with a counter-locking element 26 shown especially in FIG. 4 for establishing the locking connection described above.

Figure 4:
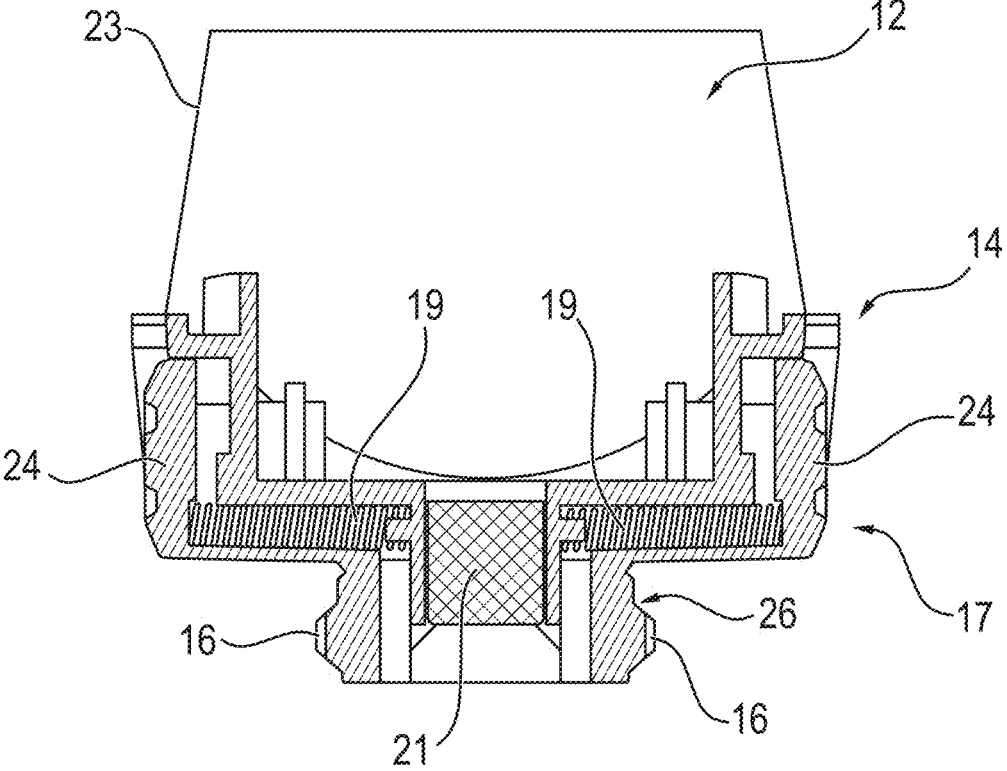
FIG. 4 is a sectional view of a camera system according to the present invention.

FIG. 4 further shows a camera system for the above-described and shown helmet camera system 10.

In addition to the embodiments shown, the present invention allows further principles of configuration, i.e., the present invention shall not be considered to be limited to the exemplary embodiments explained in reference to the figures. It is thus also possible, for example, that the helmet holding device 13 is not configured as a female connection component but as a male connection component. The camera holding device 14 may correspondingly also be configured as a female connection component. The locking mechanisms described in detail above are configured in this case as correspondingly transposed locking mechanisms. FIG. 1 and FIG. 2 show not only a helmet camera system 10, but also a fastening unit for the helmet camera system. The fastening unit comprises essentially the components of the helmet camera system 10, where the helmet 11 and the camera 12 are not to be considered to be parts of the fastening unit.

While specific embodiments of the invention have been shown and described in detail to illustrate the application of the principles of the invention, it will be understood that the invention may be embodied otherwise without departing from such principles.

LIST OF REFERENCE NUMBERS

10 Helmet camera system
11 Helmet
12 Camera
13 Helmet holding device
14 Camera holding device
15 Toothed ring
16 Toothed ring segment
17 Adjusting device
18 Radial direction
19 Spring device
20 Locking device
21 Magnet device
22 Head protection shell
23 Camera housing
24 Actuating device
25 Locking element
26 Counter-locking device
27 Holding ring

The invention claimed is:

1. A helmet camera system, comprising:
a helmet;
a camera;
a helmet holding device fastened to the helmet;
a camera holding device fastened to the camera,
wherein the helmet holding device and the camera holding device are configured to provide a non-positive and/or positive-locking connection for holding the camera at the helmet,
wherein the helmet holding device comprises a toothed ring having internal teeth and the camera holding device comprises two toothed ring segments having external teeth, wherein the toothed ring segment is configured to be positioned in the toothed ring for establishing the non-positive and/or positive-locking connection between the helmet holding device and the camera holding device, wherein the two toothed ring segments are positioned opposite each other;
an adjusting device for manually adjusting the two toothed ring segments in a radial direction of the toothed ring segments between a held state for establishing the non-positive and/or positive-locking connection and a released state for severing the non-positive and/or positive-locking connection, wherein the adjusting device is configured for adjusting the two toothed ring segments in a same adjustment direction, wherein in a held state the adjusting device fixes a position of the two ring segments to prevent rotation of the camera holding device relative to the helmet holding device and in a released state the adjusting device determines a position of the two ring segments to allow rotation of the camera holding device relative to the helmet holding device;
a locking device for establishing a locking connection between the helmet holding device and the camera holding device in the held state, wherein the locking device is configured to axially limit movement of the camera holding device relative to the helmet holding device in the held state; and a magnet device for establishing a magnetic connection force between the helmet holding device and the camera holding device in the held state and in the released state, wherein the magnet device inhibits axial movement of the camera holding device relative to the helmet holding device in both the held state and the released state.

2. A helmet camera system in accordance with claim 1, wherein the adjusting device comprises a spring device for a resilient adjustment of the the two ring segments between the held state and the released state.

3. A helmet camera system in accordance with claim 2, wherein the spring device is configured to press the the two ring segments to the toothed ring in the held state.

4. A fastening device for a helmet camera system with a helmet and with a camera, the fastening device comprising:

a helmet holding device configured to be fastened to the helmet;

a camera holding device configured to be fastened to the camera, wherein the helmet holding device and the camera holding device are configured to provide a non-positive and/or positive-locking connection for holding the camera at the helmet, wherein the helmet holding device has a toothed ring having internal teeth and the camera holding device has two toothed ring segments having external teeth, wherein the toothed ring segments can be positioned in the toothed ring for establishing the non-positive and/or positive-locking connection between the helmet holding device and the camera holding device, wherein the two toothed ring segments are positioned opposite each other; and an adjusting device for manually adjusting the two toothed ring segments in a radial direction of the toothed ring segments between a held state for establishing the non-positive and/or positive-locking connection and a released state for severing the non-positive and/or positive-locking connection, wherein the adjusting device is configured for adjusting the two toothed ring segments in a same adjustment direction, wherein in a held state the adjusting device fixes a position of the two ring segments to prevent rotation of the camera holding device relative to the helmet holding device and in a released state the adjusting device determines a position of the two ring segments to allow rotation of the camera holding device relative to the helmet holding device;

a locking device for establishing a locking connection between the helmet holding device and the camera holding device in the held state, wherein the locking device is configured to axially limit movement of the camera holding device relative to the helmet holding device in the held state; and a magnet device for establishing a magnetic connection force between the helmet holding device and the camera holding device in the held state and in the released state, wherein the magnet device inhibits axial movement of the camera holding device relative to the helmet holding device in both the held state and the released state.

5. A helmet camera system in accordance with claim 1, wherein the helmet comprises a head protection shell and the helmet holding device is formed at the head protection shell, wherein the helmet holding device is configured as an integral component of the head protection shell.

6. A helmet camera system in accordance with claim 1, wherein the camera comprises a camera housing and the camera holding device is formed at the camera housing, wherein the camera holding device is configured as an integral component of the camera housing.

7. A fastening device in accordance with claim 4, wherein the adjusting device comprises a spring device for a resilient adjustment of the the two ring segments between the held state and the released state.

8. A fastening device in accordance with claim 7, wherein the spring device is configured to press the two ring segments to the toothed ring in the held state.

9. A helmet system for a helmet camera system comprising a camera and a camera holding device fastened to the camera, the camera holding device having two toothed ring segments having external teeth, the helmet system comprising:

a helmet, wherein the helmet comprises a head protection shell;

a helmet holding device fastened to the helmet, wherein the helmet holding device has a toothed ring having internal teeth and is configured to establish a non-positive and/or positive-locking connection to the camera holding device for holding the camera at the helmet;

wherein the toothed ring is configured to receive the toothed ring segments for establishing the non-positive and/or positive-locking connection between the helmet holding device and the camera holding device, wherein the two toothed ring segments are positioned opposite each other;

an adjusting device for manually adjusting the two toothed ring segments in a radial direction of the toothed ring segments between a held state for establishing the non-positive and/or positive-locking connection and a released state for severing the non-positive and/or positive-locking connection, wherein the adjusting device is configured for adjusting the two toothed ring segments in a same adjustment direction, wherein in a held state the adjusting device fixes a position of the two ring segments to prevent rotation of the camera holding device relative to the helmet holding device and in a released state the adjusting device determines a position of the two ring segments to allow rotation of the camera holding device relative to the helmet holding device;

a locking device for establishing a locking connection between the helmet holding device and the camera holding device in the held state, wherein the locking device is configured to axially limit movement of the camera holding device relative to the helmet holding device in the held state; and a magnet device for establishing a magnetic connection force between the helmet holding device and the camera holding device in the held state and in the released state, wherein the magnet device inhibits axial movement of the camera holding device camera relative to the helmet holding device in both the held state and the released state, wherein the helmet holding device is formed at the head protection shell, wherein the helmet holding device is configured as an integral component of the head protection shell.

10. A camera system for a helmet camera system comprising a helmet comprising a head protection shell and a helmet holding device fastened to the helmet, the helmet holding device having a toothed ring having internal teeth, the camera system comprising:

a camera comprising a camera housing;

a camera holding device fastened to the camera, wherein the camera holding device comprises two toothed ring segments having external teeth and configured to establish a non-positive and/or positive-locking connection to the helmet holding device for holding the camera at the helmet, wherein the two ring segments is configured to be positioned in the toothed ring for establishing the non-positive and/or positive-locking connection between the helmet holding device and the camera holding device, and wherein the camera holding device is formed at the camera housing and the camera holding device is configured as an integral component of the camera housing;

an adjusting device for manually adjusting the ring segments in a radial direction of the toothed ring segments between a held state for establishing the non-positive and/or positive-locking connection and a released state for severing the non-positive and/or positive-locking connection, wherein the adjusting device is configured for adjusting the toothed ring segments, wherein in a held state the adjusting device rotationally fixes a position of the ring segments to prevent rotation of the camera holding device relative to the helmet holding device and in a released state the adjusting device determines a position of the ring segments to allow rotation of the camera holding device relative to the helmet holding device; and axial retaining means configured to axially limit movement of the camera holding device relative to the helmet holding device in the held state.

11. A camera system according to claim 10, wherein the axial retaining means comprises a locking device for establishing a locking connection between the helmet holding device and the camera holding device in the held state, wherein the locking device is configured to axially limit movement of the camera holding device relative to the helmet holding device in the held state.

12. A camera system according to claim 10, wherein the axial retaining means comprises a magnet device for establishing a magnetic connection force between the helmet holding device and the camera holding device in the held state and in the released state, wherein the magnet device inhibits axial movement of the camera holding device relative to the helmet holding device in the held state and inhibits axial movement and allows rotational movement of the camera holding device relative to the helmet holding device in the released state.

* * * * *